April 21, 1953

R. D. PIKE 2,635,945

PRODUCTION OF POTASSIUM NITRATE FROM
WYOMINGITE AND SODIUM NITRATE

Filed July 19, 1950

INVENTOR.
ROBERT D PIKE
BY Pollard D Johnston

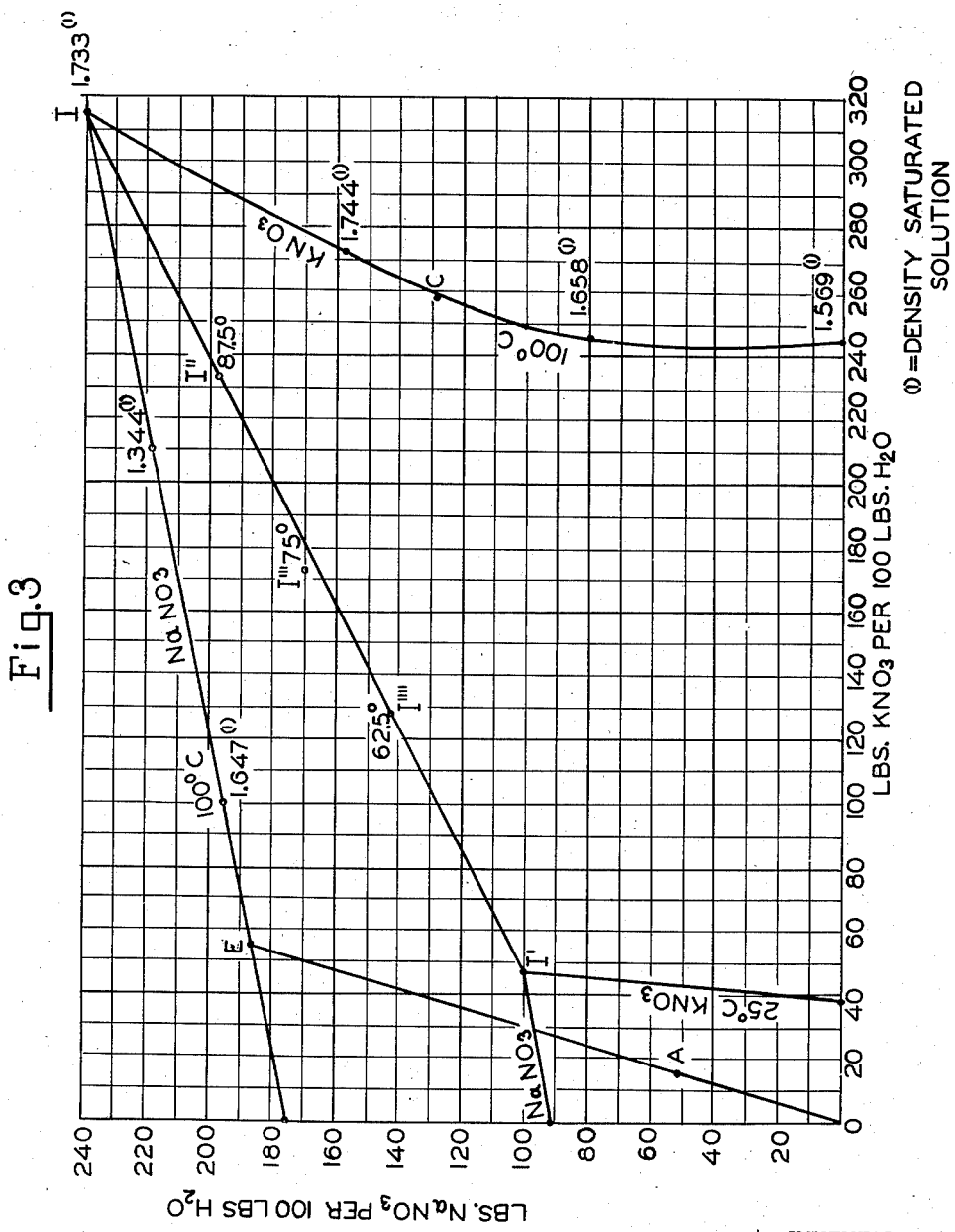

Patented Apr. 21, 1953

2,635,945

UNITED STATES PATENT OFFICE 2,635,945

PRODUCTION OF POTASSIUM NITRATE FROM WYOMINGITE AND SODIUM NITRATE

Robert D. Pike, Greenwich, Conn.

Application July 19, 1950, Serial No. 174,623

8 Claims. (Cl. 23—102)

This invention relates to the production of potassium nitrate by base exchange between the potassium in base exchange minerals such as wyomingite and other potassium bearing minerals capable of base exchange with sodium and sodium nitrate.

Wyomingite is a potash bearing igneous rock which occurs in the southwestern part of Wyoming, from which about 8 pounds of $K_2O$ per 100 pounds of rock can be economically recovered by base exchange with sodium under suitable conditions of pressure and temperature. Other minerals such as Italian leucite are capable of undergoing base exchange of potassium with sodium salts.

In earlier patents, Re. 18,393, 2,343,080, 2,343,081, and 2,448,191, I have described methods for the manufacture of substantially pure potassium carbonate by base exchange from wyomingite and sodium carbonate. I have found, however, that when I effect base exchange of potassium from wyomingite with an alkaline substance like sodium carbonate, I take a considerable amount of silica into the solution, which I must remove by special treatment; otherwise it renders the product impure because of its presence. On the other hand, if I use sodium nitrate, which is neutral, as the base exchange medium, very little, if any, silica is dissolved from the wyomingite and I therefore prefer to use in my present invention an excess of sodium nitrate as the base exchange medium, subsequently separating the potassium nitrate, either as a pure salt, or as mixed crystals, with sodium nitrate, from the remaining surplus of sodium nitrate which is then recovered as a commercially pure compound.

It is the object of my invention to treat ground wyomingite with a water solution of sodium nitrate, under steam pressure in an autoclave, to effect removal of substantially all of the potassium contained by the leucite of the wyomingite, by base exchange, then to remove the solution from the residue and to separately recover the surplus sodium nitrate over that consumed in base exchange and the potassium nitrate.

Further objects and advantages of my invention will appear as this description proceeds.

Referring now to the drawings which show preferred methods of practicing the invention:

Figure 3 is the system $NaNO_3.KNO_3.H_2O$.

Figure 1:
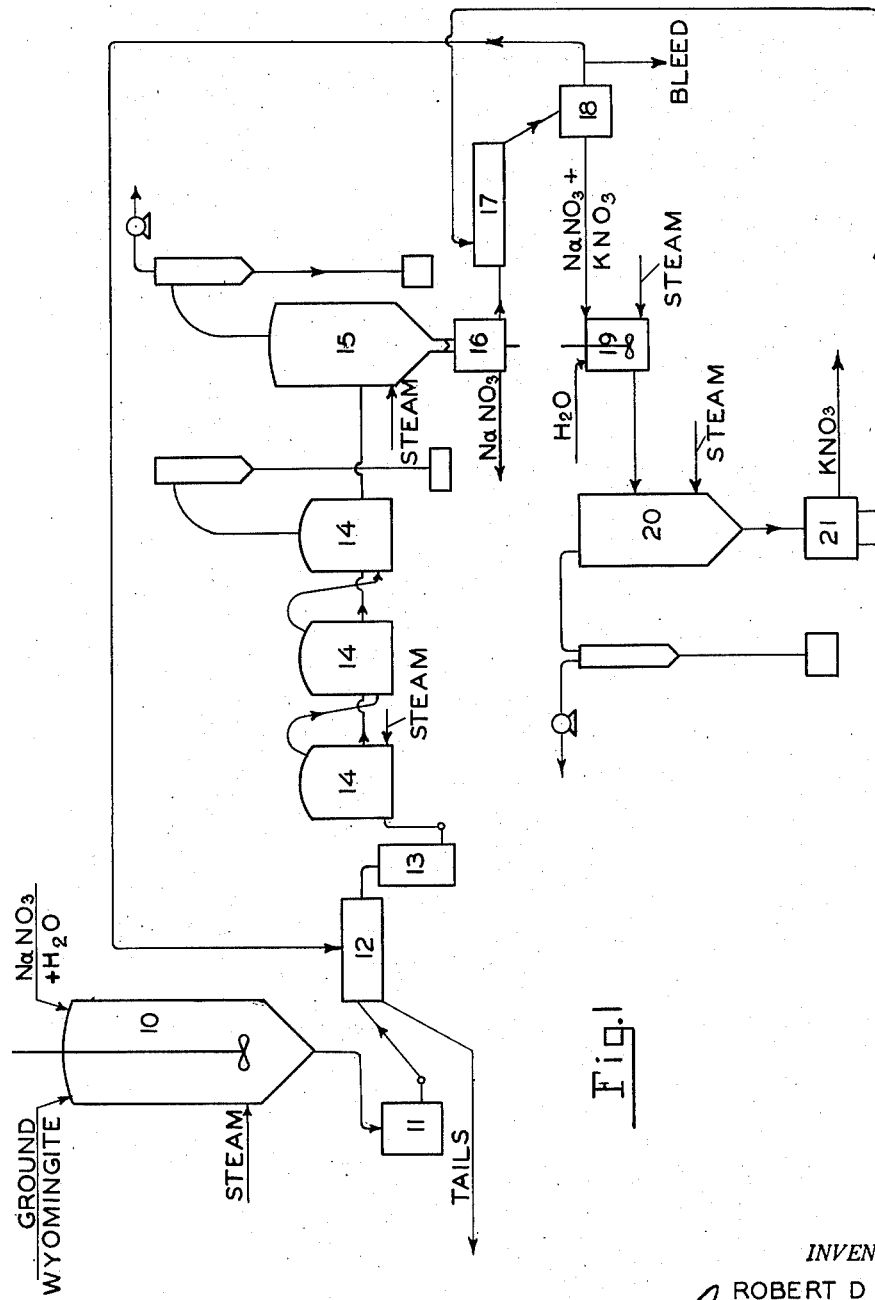
Figure 1 is a diagrammatic outline of a plant using an embodiment of my process, which produces both the $KNO_3$ and the $NaNO_3$ separately as commercially pure compounds.

While any suitable base exchange procedure may be used for extracting potassium from wyomingite, I have illustrated diagrammatically in Figure 1 a batch procedure in which ground wyomingite, preferably no coarser than −10 mesh and a solution of $Na_2NO_3$, with the latter compound preferably considerably in excess of the amount required to effect base exchange between its contained Na+ and the K+ of the wyomingite are introduced into an autoclave 10. Steam pressure is applied, usually at 200 to 250 pounds per square inch and the temperature maintained around 200° C., and the batches stirred for from one to three hours. The resulting slurry is discharged into a tank 11, and is then filtered in filter 12, the clarified liquor is stored in 13, where a small amount of activated carbon may be added to remove the tendency to foam. If carbon be used, as is preferable, it may be removed later by filtration and revived for reuse.

The clarified and treated liquor is now fed to multi-effect evaporators 14 which I have shown as triple effect. The usual composition of the evaporator feed is indicated by point A, Figure 3. Evaporation takes place along the line OAE without crystallization. The major part of the water is thus evaporated continuously. I may, if I prefer, use submerged combustion evaporators for this first stage of the evaporation.

Evaporation next proceeds from E to I, preferably in vacuum pans 15, which may operate on batches. The crystals produced are commercially pure $NaNO_3$ and are removed in centrifuges or other suitable device 16. They may be washed in suitable equipment not shown, and, if so, the wash water is preferably returned to tank 13. The mother liquor from the crystals goes to water cooled crystallizer 17, or a vacuum crystallizer may be used. In this crystallizer cooling takes place from I to I' with crystallization of mixed crystals of $NaNO_3$ and $KNO_3$, containing about 60% of the latter. Crystallization need not be carried as far as 25° C., as indicated, and usually some suitable intermediate point, varying from 30–60° C., will be chosen. The choice of the temperature range of crystallization is dictated by economic considerations.

The crystals are removed in the centrifuge 18, and are redissolved in hot water in agitated tank 19 to form a hot saturated solution at about 100° C., corresponding to point C, Figure 3. The mother liquor from the crystals made in 17 and separated in 18, is recycled to 12 and from this stream I preferably withdraw a small bleed to keep down the accumulation of such soluble impurities as sulphates and chlorides. The former are introduced to a minor extent with the wyomingite and the latter with the NaNO$_3$ solution, which is preferably made by neutralizing a solution of Wyoming trona or crude soda ash (calcined trona) with nitric acid.

The hot saturated solution from 19 goes to vacuum evaporator 20, which may be run on batches, and there I crystallize commercially pure KNO$_3$ along the line from C to I, Figure 3. The KNO$_3$ crystals thus produced are removed in centrifuge 21 and the hot mother liquor, corresponding to I, joins the mother liquor of the same composition from 16, in entering crystallizer 17.

By this embodiment of my process, I start with relatively dilute plant solutions of NaNO$_3$, use them for base exchange to produce KNO$_3$ and utilize the process, at the same time, for producing all of the surplus NaNO$_3$ as commercially pure crystals and all of the KNO$_3$ also as commercially pure compound.

Figure 2:
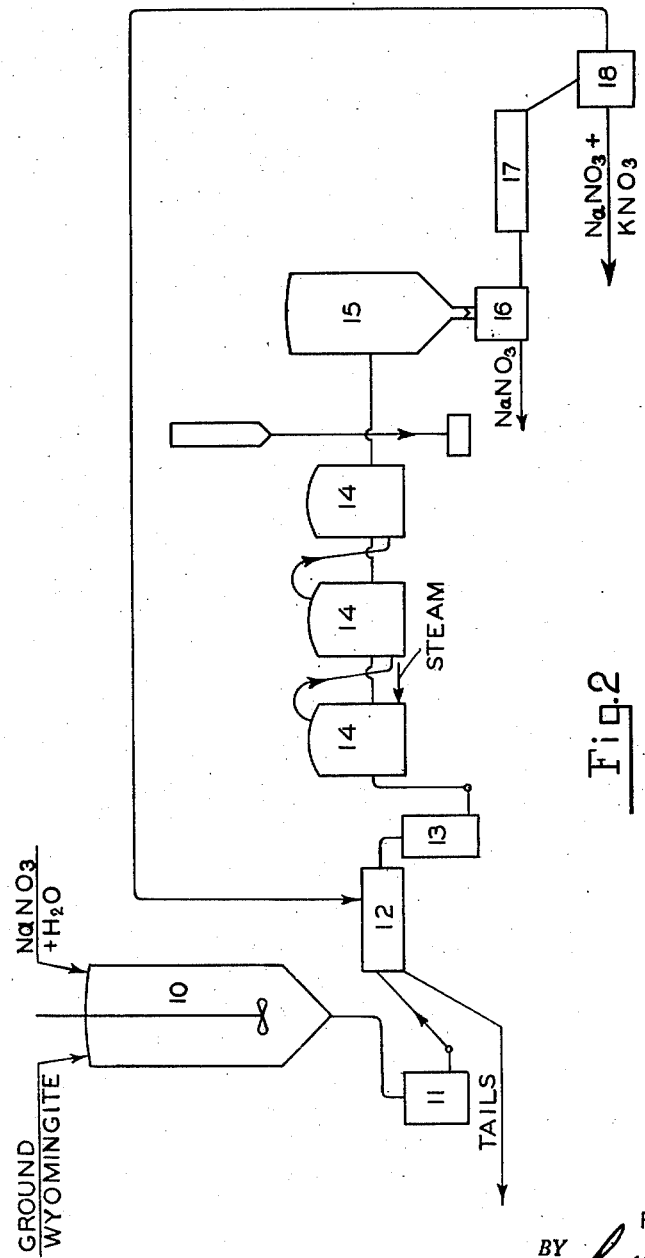
Figure 2 illustrates another embodiment which produces commercially pure sodium nitrate as one product, and mixed crystals of $KNO_3$ and $NaNO_3$, containing over 60% of the former, as another product.

Referring to Figure 2, I have used the same reference numerals as for Figure 1, and it will be noted that the process is the same, except that the NaNO$_3$ and KNO$_3$ mixed crystals are removed from 18 and do not re-enter the circulation. On the other hand, they form one of the products of the process which will ordinarily have sufficient content of K$_2$O to realize the value of this constituent as a fertilizer. A typical analysis of these crystals is, K$_2$O, 17%, N$_2$, 14.5%.

It will, of course, be obvious that the process modifications of Figures 1 and 2 can both be operated in the same plant, and if desired, the grade of the mixed crystals could be increased by mixing with them a suitable amount of pure KNO$_3$.

Example 1

In this example I employ the following autoclave charge which will produce 1,000 tons KNO$_3$ and 4,160 tons NaNO$_3$:

| | Tons |
|---|---|
| Wyomingite | 5,660 |
| NaNO$_3$ | 5,000 |
| Water | 7,340 |

So far as base exchange is concerned, I need supply only 3,030 tons NaNO$_3$, producing 2,190 tons net. But the same amount of water must be used in either case, and ordinarily the larger amount of NaNO$_3$ will prove to be the more profitable to manufacture.

When using 5,000 tons NaNO$_3$, the autoclave charge has a starting concentration of 68 lbs. NaNO$_3$ per 100 lbs. water, which is far below saturation with NaNO$_3$ at 100° C. (see Fig. 3).

Considering the steam used in the autoclave, the loss of steam by flash evaporation and the water used to wash the tails, the net increase in the amount of water originally charged to the autoclave is from 7,340 tons to 8,740 tons. This net advance from the autoclave is mixed with the mother liquor from the mixed crystals from 18 and, under a steady state of operation, the composition of the liquor entering the evaporator for the production of 1,000 tons KNO$_3$ and 4,160 tons NaNO$_3$ is about as follows:

| Item | Tons | Lbs. per 100 Lbs. H$_2$O |
|---|---|---|
| NaNO$_3$ | 5,283 | 53.6 |
| KNO$_3$ | 1,534 | 15.6 |
| H$_2$O | 9,863 | |
| Total | 16,680 | |

This feed corresponds to point A, Figure 3.

The net evaporation of water is about 9,860 tons without taking withdrawal and discard of solution into account. Also, the circulation of mixed crystals is 4,500 tons to produce 1,000 tons pure KNO$_3$.

Certain amounts of K$_2$SO$_4$ and KCl are added to the circulation from the wyomingite and from the Wyoming trona, which is ordinarily used to prepare the NaNO$_3$ by neutralizing the Wyoming trona with nitric acid. The amounts picked up per 1,000 tons KNO$_3$ entering the evaporative system from the base exchange autoclave, are about as follows:

| | Tons |
|---|---|
| K$_2$SO$_4$ | 30 |
| KCl | 6 |

It will be noted that the total circulation is 16,680 tons and if sufficient of this is withdrawn to account for 10% of the new KNO$_3$, or 100 tons, this will account for the withdrawal of 6.5% of the circulation, or 643 tons water. The concentration of K$_2$SO$_4$ and KCl in the circulation, must be such as to account for the totals added when applied to the withdrawn portion. These concentrations, expressed as pounds per 100 pounds H$_2$O are as follows:

$$K_2SO_4 \frac{30 \times 100}{643} = 4.7$$

$$KCl = .94$$

These concentrations of K$_2$SO$_4$ and KCl are such as not to seriously alter the system NaNO$_3$, KNO$_3$, H$_2$O shown in Figure 3 and with regulated withdrawal, as indicated at 18, the concentration of K$_2$SO$_4$ and KCl can be kept at a level which will not interfere with the recovery process. The withdrawn portion may, of course, be treated in any suitable manner for the recovery of its values in K$_2$O and N$_2$.

If the circulation is not bled to remove K$_2$SO$_4$ and KCl, these will accumulate and will come out with the mixed crystals from I to I'. In Example 2 I show that these may be removed and marketed in whole or in part as a fertilizer material. If this be done, the accumulation of K$_2$SO$_4$ and KCl in the circulation is prevented, and the presence of these compounds in the mixed crystals does not lessen their value for fertilizer use.

Example 2

If the process be operated as shown in Figure 2, for each 1,000 tons KNO$_3$ produced, there would be marketed 1,585 tons mixed crystals containing 585 tons NaNO$_3$, and in addition, there would be marketed 3,565 tons pure NaNO$_3$. The mixed crystals are a suitable fertilizer material and have about the following composition:

| | Per cent |
|---|---|
| K$_2$O as KNO$_3$ | 17 |
| N$_2$ | 14.5 |

These crystals will also contain about 2%

$K_2SO_4$ plus $KCl$, mostly the former, which add to the value as a fertilizer.

When operating in this fashion, the added $K_2SO_4$ and $KCl$ are removed with the mixed crystals, and there is no need to withdraw any of the circulating liquor to keep down their accumulation. The circulation entering the evaporative system per 1,000 tons $KNO_3$, is about as follows:

| Item | Tons | Lbs./100 Lbs. $H_2O$ |
|---|---|---|
| $NaNO_3$ | 4,690 | 50.6 |
| $KNO_3$ | 1,255 | 13.5 |
| $H_2O$ | 9,270 | |
| Total | 15,215 | |

Ordinarily a combination of Examples 1 and 2 would be practiced so as to supply the demand for pure $KNO_3$, or saltpeter, and to produce as much of the mixed crystals as the market will absorb for use as fertilizer.

While I have illustrated and described two preferred methods of practicing my invention, it will be understood that various modifications and changes can be made from the preferred embodiments without departing from the spirit of my invention or the scope of the following claims.

I claim:

1. The method of producing sodium and potassium nitrates from potassium silicate base exchange minerals and sodium nitrate, which comprises heating a potassium silicate base exchange mineral, sodium nitrate and water, in a closed container under pressure, to effect base exchange between the sodium of said nitrate and potassium of said mineral, forming a solution containing sodium and potassium nitrates, separating the resultant solution from solid matter and exaporating it to remove water, and to crystallize out sodium nitrate, then cooling to crystallize mixed crystals of sodium nitrate and potassium nitrate, separating these from the mother liquor remaining therein, and recirculating the mother liquor to the evaporator.

2. The method of producing sodium and potassium nitrates from potassium silicate base exchange minerals and sodium nitrate, which comprises heating a potassium silicate base exchange mineral, sodium nitrate and water, in a closed container under pressure, to effect base exchange between the sodium of said nitrate and the potassium of said mineral and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor, dissolving the mixed crystals in hot water to form a substantially saturated solution, evaporating to crystallize out potassium nitrate, separating the potassium nitrate crystals, then cooling the liquor to produce another lot of the mixed crystals which are in turn separated from the mother liquor and returning this mother liquor together with the first mentioned mother liquor to the evaporating system for further evaporation.

3. The method of producing sodium and potassium nitrates from potassium silicate base exchange minerals and sodium nitrate, which comprises heating a potassium silicate base exchange mineral, sodium nitrate and water, in a closed container under pressure, to effect base exchange between the sodium of said nitrate and the potassium of said mineral and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor, dissolving the mixed crystals in hot water to form a substantially saturated solution, evaporating to crystallize out potassium nitrate, separating the potassium nitrate crystals, then cooling the liquor to produce another lot of the mixed crystals which are in turn separated from the mother liquor and returning this mother liquor together with the first mentioned mother liquor to the evaporating system for further evaporation and bleeding off a portion of the recirculating mother liquor to keep down the concentration of potassium sulfate and potassium chloride therein.

4. The method of producing sodium and potassium nitrates from potassium silicate base exchange minerals and sodium nitrate, which comprises heating a potassium silicate base exchange mineral, sodium nitrate and water, in a closed container under pressure, to effect base exchange between the sodium of said nitrate and the potassium of said mineral and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor and returning the mother liquor for further evaporation, dissolving the mixed crystals in hot water to form a substantially saturated solution, evaporating to crystallize out potassium nitrate, separating the potassium nitrate crystals and returning the liquor to the cooling system to produce another lot of the mixed crystals which are in turn separated from the mother liquor and returning this mother liquor for further evaporation.

5. The method of producing sodium and potassium nitrates from wyomingite, which comprises heating wyomingite, sodium nitrate and water, in a closed container under pressure, to effect base exchange between the sodium of said nitrate and the potassium of said wyomingite, forming a solution containing sodium and potassium nitrates, separating the resultant solution from solid matter and evaporating it to remove water, and to crystallize out sodium nitrate, then cooling to crystallize mixed crystals of sodium nitrate and potassium nitrate, separating these from the mother liquor remaining therein, and recirculating the mother liquor to the evaporator.

6. The method of producing sodium and potassium nitrates from wyomingite, which comprises heating wyomingite, sodium nitrate and water, in a closed container under pressure, to effect base exchange between the sodium of said nitrate and the potassium of said wyomingite and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor, dissolving the mixed crystals in hot water to form a substantially saturated solution, evaporating to crystallize out potassium nitrate, separating the potassium nitrate crystals, then cooling the liquor to produce another lot of the mixed crystals which are in turn separated from the mother liquor and returning this mother liquor together with the first mentioned mother liquor to the evaporating system for further evaporation.

7. The method of producing sodium and potassium nitrates from wyomingite, which comprises heating wyomingite, sodium nitrate and water, in a closed container under pressure, to effect base exchange between the sodium of said nitrate and the potassium of said wyomingite and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor, dissolving the mixed crystals in hot water to form a substantially saturated solution, evaporating to crystallize out potassium nitrate, separating the potassium nitrate crystals, then cooling the liquor to produce another lot of the mixed crystals which are in turn separated from the mother liquor and returning this mother liquor together with the first mentioned mother liquor to the evaporating system for further evaporation and bleeding off a portion of the recirculating mother liquor to keep down the concentration of potassium sulfate and potassium chloride therein.

8. The method of producing sodium and potassium nitrates from wyomingite, which comprises heating wyomingite, sodium nitrate and water, in a closed container under pressure, to effect base exchange between the sodium of said nitrate and the potassium of said wyomingite and forming a solution containing sodium and potassium nitrates, separating the resulting solution from solid matter and evaporating it to remove water, and to crystallize out sodium nitrate, separating the sodium nitrate crystals, then cooling to crystallize mixed crystals of sodium nitrate and potassium nitrate, separating the mixed crystals from the mother liquor, and returning the mother liquor for further evaporation, dissolving the mixed crystals in hot water to form a substantially saturated solution, evaporating to crystallize out potassium nitrate, separating the potassium nitrate crystals, and returning the liquor to the cooling system to produce another lot of the mixed crystals which are in turn separated from the mother liquor and returning this mother liquor for further evaporation.

ROBERT D. PIKE.

References Cited in the file of this patent

UNITED STATES PATENTS

| Number | Name | Date |
|---|---|---|
| 1,356,806 | Calvert | Oct. 26, 1920 |
| 1,770,995 | Pike et al. | July 22, 1930 |
| 2,157,260 | Dessevre et al. | May 9, 1939 |
| 2,343,081 | Pike | Feb. 29, 1944 |
| 2,455,190 | Pike | Nov. 30, 1948 |

FOREIGN PATENTS

| Number | Country | Date |
|---|---|---|
| 179,287 | Great Britain | May 1, 1922 |